(12) United States Patent
Serotta et al.

(10) Patent No.: US 9,027,766 B1
(45) Date of Patent: May 12, 2015

(54) ADJUSTABLE BRACKET FOR HOLDING AUXILIARY EQUIPMENT FOR TELEVISIONS

(76) Inventors: William Serotta, Tampa, FL (US); Brandy Serotta, Tampa, FL (US)

( * ) Notice: Subject to any disclaimer, the term of this patent is extended or adjusted under 35 U.S.C. 154(b) by 492 days.

(21) Appl. No.: 13/310,286

(22) Filed: Dec. 2, 2011

Related U.S. Application Data

(60) Provisional application No. 61/421,436, filed on Dec. 9, 2010.

(51) Int. Cl.
*A47B 81/06* (2006.01)

(52) U.S. Cl.
CPC .............. *A47B 81/06* (2013.01); *Y10S 248/917* (2013.01)

(58) Field of Classification Search
CPC .... A47B 1/061; A47B 81/06; A47B 21/0371; A47B 21/0314; Y10S 248/917; Y10S 248/918; Y10S 248/92; Y10S 248/921; Y10S 248/922; Y10S 248/919; Y10S 248/923; Y10S 248/924
USPC ..................... 211/90.02, 208, 90.04, 119.003; 248/917–924; 108/50.01, 50.11
See application file for complete search history.

(56) References Cited

U.S. PATENT DOCUMENTS

| | | | |
|---|---|---|---|
| 6,289,826 B1 * | 9/2001 | Waisbrod | 108/157.1 |
| 6,581,887 B2 * | 6/2003 | Lapidez | 248/122.1 |
| 7,261,261 B2 * | 8/2007 | Ligertwood | 248/129 |
| 7,448,584 B2 * | 11/2008 | Chen et al. | 248/278.1 |
| 7,823,847 B2 * | 11/2010 | Bremmon et al. | 248/201 |
| 7,854,415 B2 * | 12/2010 | Holbrook et al. | 248/125.2 |
| D648,161 S * | 11/2011 | Truckor | D6/511 |
| 8,079,311 B2 * | 12/2011 | Whalen et al. | 108/42 |
| 8,322,673 B2 * | 12/2012 | Sculler | 248/317 |
| 8,418,861 B1 * | 4/2013 | Weaver et al. | 211/90.02 |
| 8,622,005 B1 * | 1/2014 | Whalen et al. | 108/42 |
| 8,628,050 B2 * | 1/2014 | Truckor | 248/205.1 |
| 2001/0040205 A1 * | 11/2001 | Waisbrod | 248/235 |
| 2004/0045224 A1 * | 3/2004 | Chesser et al. | 52/29 |
| 2004/0188573 A1 * | 9/2004 | Weatherly | 248/125.1 |
| 2005/0230573 A1 * | 10/2005 | Ligertwood | 248/158 |
| 2006/0060738 A1 * | 3/2006 | Whittington et al. | 248/295.11 |
| 2007/0023593 A1 * | 2/2007 | Fedewa | 248/201 |
| 2008/0068784 A1 * | 3/2008 | Bouissiere | 361/681 |
| 2008/0105633 A1 * | 5/2008 | Dozier et al. | 211/26 |
| 2008/0156949 A1 * | 7/2008 | Sculler et al. | 248/220.21 |
| 2009/0039212 A1 * | 2/2009 | Whalen et al. | 248/158 |
| 2009/0200439 A1 * | 8/2009 | Bremmon et al. | 248/183.1 |
| 2011/0079687 A1 * | 4/2011 | Grove | 248/168 |
| 2011/0079688 A1 * | 4/2011 | Grove | 248/176.3 |
| 2011/0198461 A1 * | 8/2011 | Truckor | 248/205.1 |

* cited by examiner

*Primary Examiner* — Patrick Hawn

(57) ABSTRACT

An adjustable bracket system for supporting auxiliary equipment above or below a television having a shelf panel, a first and a second L-shaped support with a support portion and an extension portion that together form an L-shaped piece, the support portions are attached to the bottom surface of the shelf panel and the extension portions extend upwardly from a second end of the shelf panel above the top surface of the shelf panel, the L-shaped supports are spaced a distance apart and are oriented parallel to each other, a first and a second mounting tube that are generally hollow with a open ends where the extension portion of the L-shaped support is telescopically received in the second end of the mounting tube, the L-shaped supports can be secured in a position, the first ends of the mounting tubes are to telescopically receive a wall mounting bracket for a television.

9 Claims, 6 Drawing Sheets

Front View

Cross Section

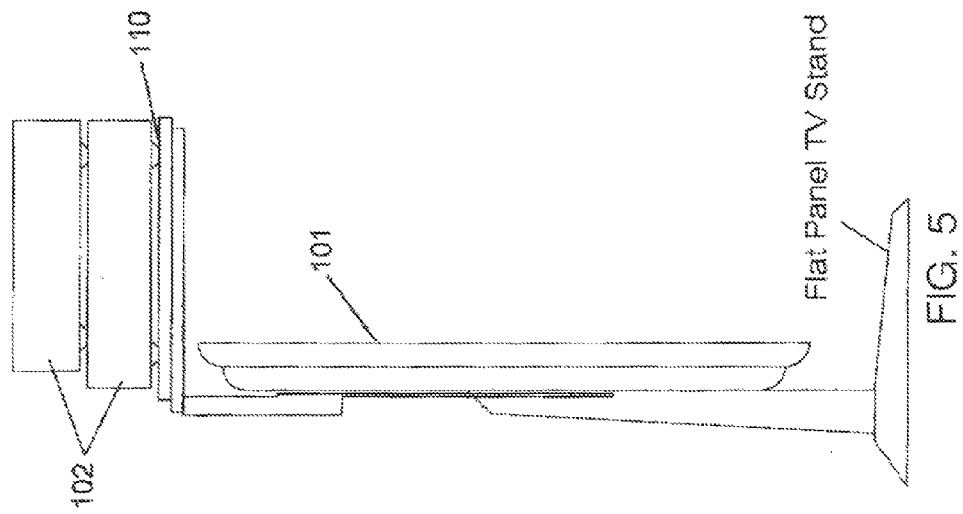
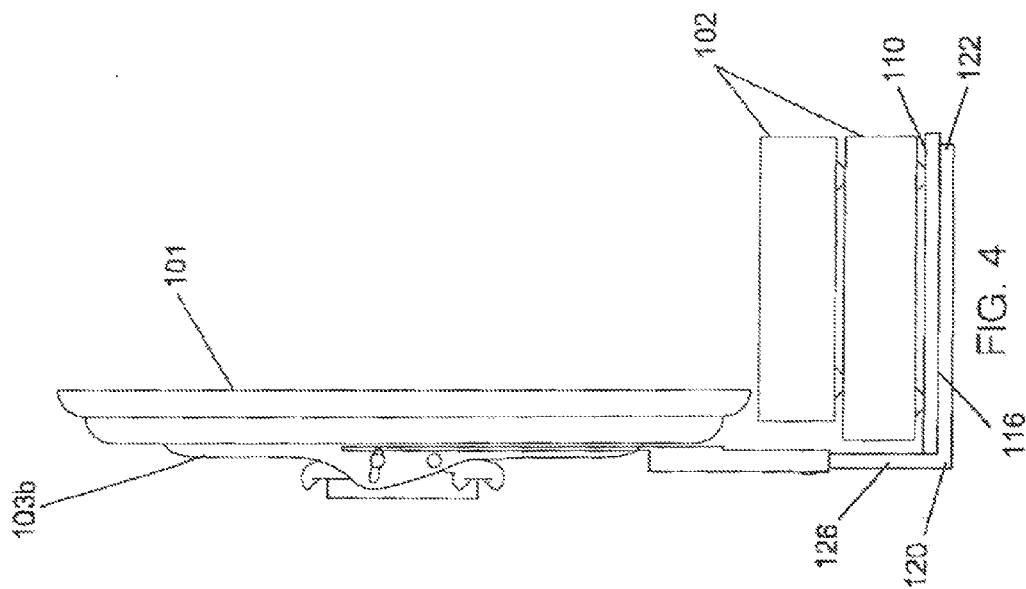

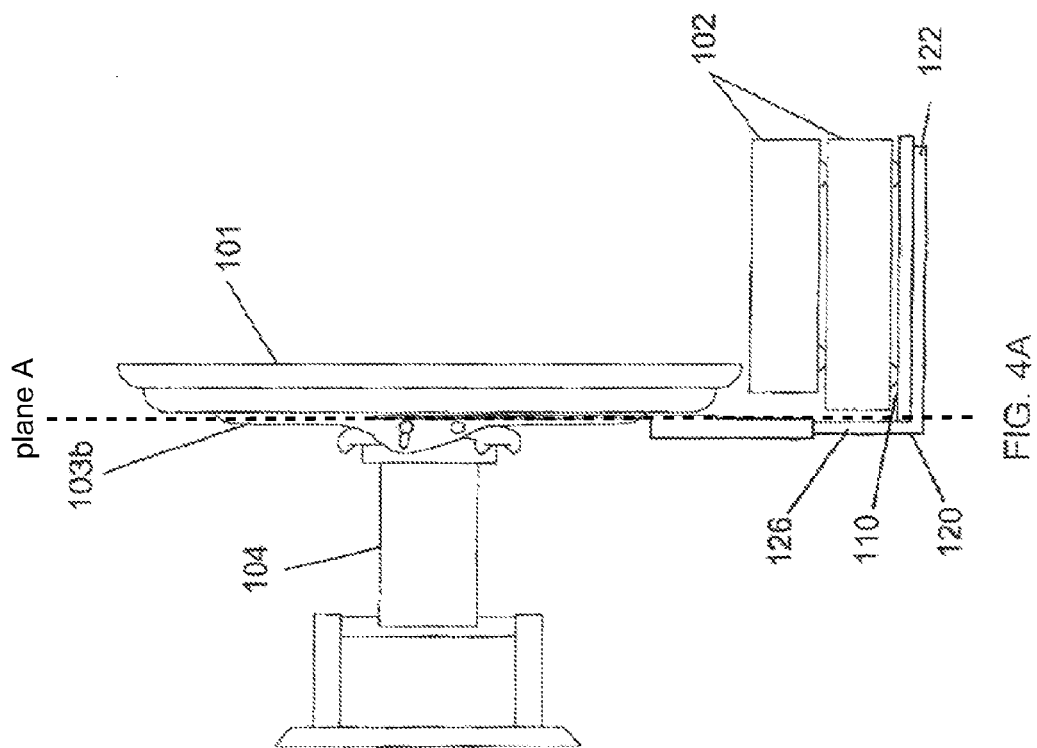

ADJUSTABLE BRACKET FOR HOLDING AUXILIARY EQUIPMENT FOR TELEVISIONS

CROSS REFERENCE

This application claims priority to U.S. provisional application Ser. No. 61/421,436 filed Dec. 9, 2010, the specification of which is incorporated herein by reference in its entirety.

BACKGROUND OF THE INVENTION

Many individuals mount their flat-screen televisions on a wall with standard mounts. Such standard mounts for flat-screen televisions allow for movement (e.g., pivoting) of the television to achieve a preferred angle. The auxiliary equipment used with the television (e.g. receiver, DVD player, cable box, etc.) is then typically either placed on a stand or countertop below the television or mounted on a fixed wall mount below the television. As such, when the television is pivoted, the auxiliary equipment does not pivot along with the television. This can cause problems with the remote control as the remote control works best when the remote is directly in line with the auxiliary equipment. Furthermore, cables hanging from the television to the auxiliary equipment below can be cumbersome and unsightly.

The present invention features an adjustable bracket system for auxiliary equipment for televisions. The system of the present invention helps conveniently store all auxiliary components under or above a suspended flat-screen television and allows the auxiliary components to move (e.g. pivot) along with the television. The system of the present invention is vertically adjustable to accommodate multiple components held below or above the television. The system of the present invention also allows the television and auxiliary equipment to be pushed flush against the wall to minimize space taken up by the equipment.

SUMMARY

The present invention features an adjustable bracket for holding auxiliary equipment for televisions. In some embodiments, the adjustable bracket system for supporting auxiliary equipment above or below a television, said system comprises a shelf panel having a top surface and a bottom surface; a first L-shaped support and a second L-shaped support, each L-shaped support has a support portion and an extension portion that together form an L-shaped piece, the support portions are attached to the bottom surface of the shelf panel and the extension portions extend upwardly from a second end of the shelf panel above the top surface of the shelf panel, the L-shaped supports are spaced a distance apart and are oriented parallel to each other; a first mounting tube and a second mounting tube, each mounting tube has a first end and a second end, the second end being open and generally hollow, the top end of the extension portion of the first L-shaped support is telescopically received in the second end of the first mounting tube and the top end of the extension portion of the second L-shaped support is telescopically received in the second end of the second mounting tube, the L-shaped supports can be secured in a position within the respective mounting tubes via a securing means; and a first attachment bar extending upwardly from the first end of the first mounting tube is and a second attachment bar extending upwardly from the first end of the second mounting tube, multiple apertures are disposed along each attachment bar. the apertures are adapted to receive screws or bolts that connect to a television.

In some embodiments, the shelf panel is rectangular in shape.

In some embodiments, a first attachment means secures the support portions of the L-shaped supports to the bottom surfaced of the shelf panel. In some embodiments, the first attachment means comprises a screw mechanism, a magnet mechanism, a bracket mechanism, a snap mechanism, a clamp mechanism, or a combination thereof. In some embodiments, the securing means comprises a spring-loaded pin and aperture means, a screw and aperture means, or a combination thereof.

In some embodiments, the system further comprises a television, wherein the attachment bars are secured to a back portion of the television and the shelf panel is oriented either above or below the television. In some embodiments, the system further comprises a mounting bracket, the attachment bars are secured to vertical support slats of the mounting bracket. In some embodiments, the mounting bracket comprises an articulating arm.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 4 is a side view of the system of the present invention.

FIG. 4A is a side view of the system of the present invention (with an articulating arm).

FIG. 5 is a side view of the system of the present invention.

DESCRIPTION OF PREFERRED EMBODIMENTS

Figure 1:
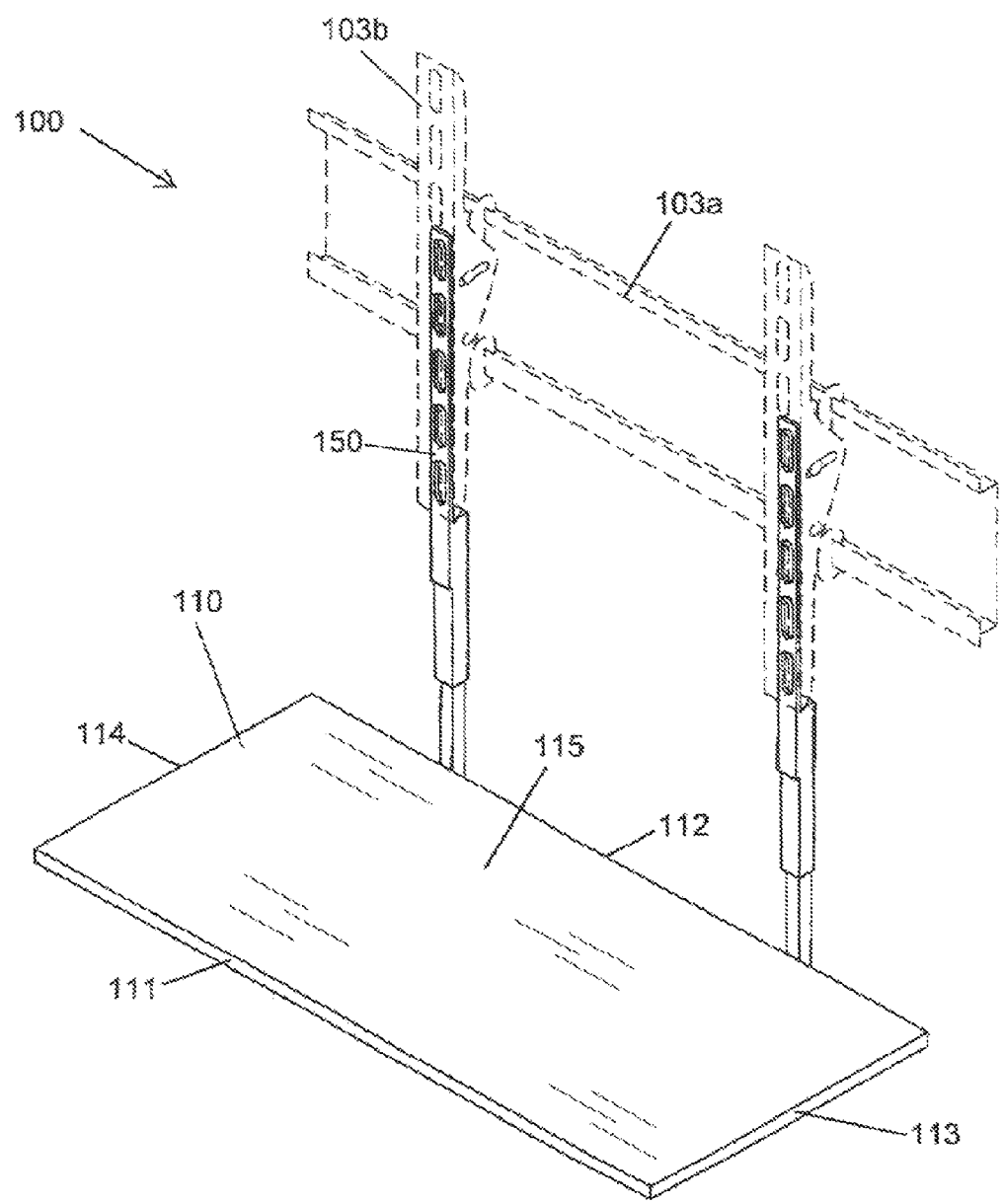
FIG. 1 is a perspective view of the system of the present invention.

Referring now to FIG. 1-5, the present invention features an adjustable bracket system 100 for supporting auxiliary equipment 102 for a television 101. The television may be mounted on a mounting bracket 103, on a mounting bracket 103 with an articulating arm 104, or mounted atop a table or other surface.

The bracket system 100 comprises a shelf panel 110 having a first end 111, a second end 112 opposite the first end 111, a third end 113, a fourth end 114 opposite the third end 113, a top surface 115, and a bottom surface 116. As shown in FIG. 1, the first end 111 is the front end and the second end 112 is the back end. In some embodiments, the shelf panel 110 is rectangular in shape, however the shelf panel 110 is not limited to this shape. For example, in some embodiments: the shelf panel 110 is oval in shape, trapezoidal in shape, etc.

A first L-shaped support 120a and a second L-shaped support 120b are attached to the shelf panel 110. Each L-shaped support 120 has a support portion 122 and an extension portion 126 that together form an L-shaped piece (e.g., connected together at about a 90 degree angle). The support portions 122 are attached to the bottom surface 116 of the shelf panel 110 and the extension portions 126 extend upwardly from the second end 112 of the shelf panel 110 above the top surface 115 of the shelf panel 110 (see FIG. 3). The L-shaped supports 120 are spaced a distance apart (e.g., see FIG. 1). The extension portions 126 of the L-shaped supports 120 (when attached to the shelf panel) are oriented generally parallel to each other. In some embodiments, a first attachment means secures the support portions 122 of the L-shaped supports 120 to the shelf panel 110. In some embodiments, the first attachment means comprises a screw mechanism 130 (shown in FIG. 3), a magnet mechanism, a bracket mechanism, a snap mechanism, a clamp mechanism, the like, or a combination thereof.

As shown in FIG. 1, the mounting bracket 103 for the television 101 comprises a horizontal support bar 103a and a pair of vertical support slats 103b each with a plurality of slat slots 103c arranged along their lengths. As used herein, the terms "horizontal," "vertical," "top," "bottom," "front," and "back," are for reference to FIG. 1-5 only and do not in any way limit the overall orientation of the present invention. For example, as shown in FIG. 4, the system 100 can be oriented to place the auxiliary equipment 102 below the television 101 and as shown in FIG. 5, the system 100 can alternatively be oriented in an opposite orientation to place the auxiliary equipment 102 above the television 101.

Figure 3:
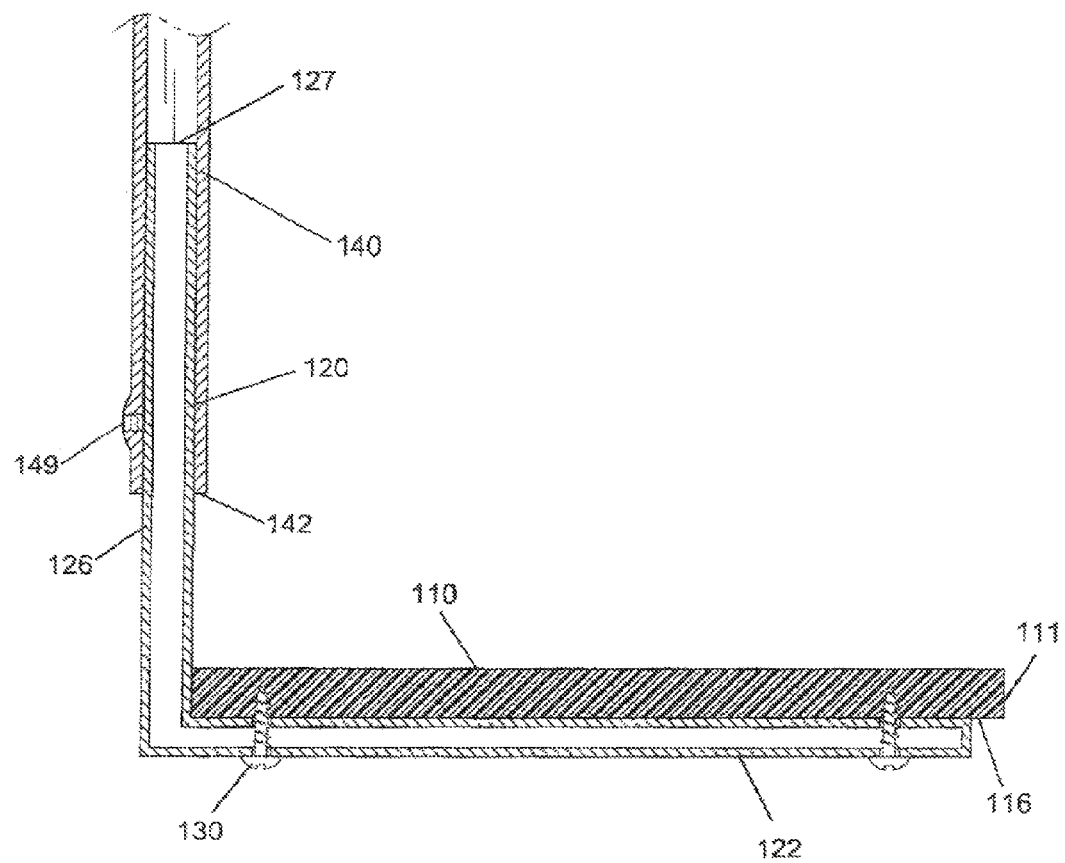
FIG. 3 is a cross sectional view of the system of the present invention.

The system 100 further comprises a first mounting tube 140a and a second mounting tube 140b. Each mounting tube 140 has a first and 141 (e.g., a top end) and a second end 142 (e.g. a bottom end). The second end 142 is open and generally hollow. As shown in FIG. 3, the top ends 127 of the extension portions 126 of the L-shaped supports 120 are telescopically received in the second ends 142 of the mounting tubes 140. The L-shaped supports 120 can be secured in a position within the mounting tubes 140 via a securing means. Any appropriate securing means may be used including but not limited to a spring-loaded pin and aperture means, a screw and aperture means (e.g., see Allen screw 149 in FIG. 3), the like, or a combination thereof. Such securing means are well known to one of ordinary skill in the art. One, two, or more than two pieces of auxiliary equipment can be positioned between the shelf panel 110 and the television 101 because of the ability to adjust the position of the L-shaped supports 120 with respect to the mounting tubes 140.

Figure 1A:
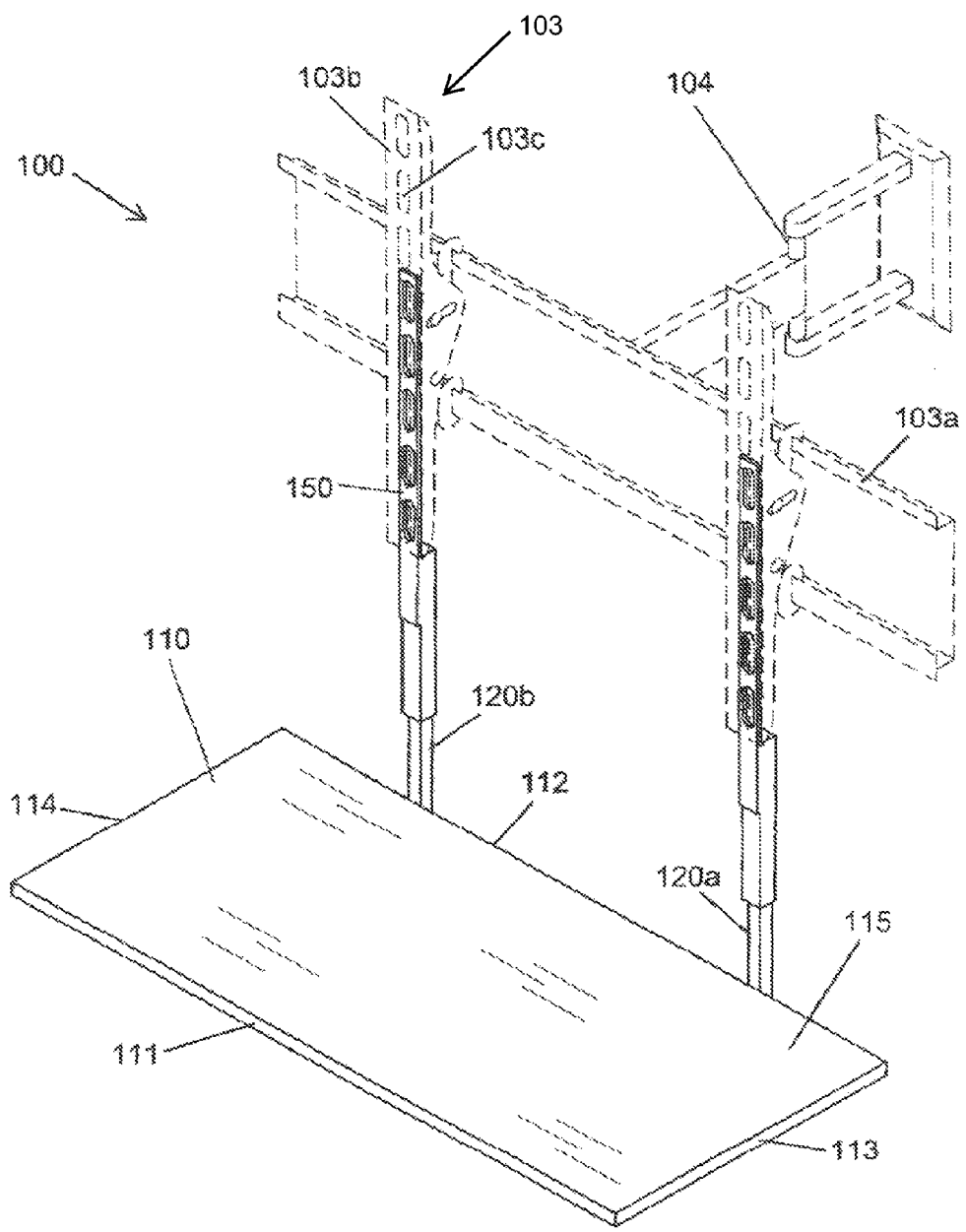
FIG. 1A is a perspective view of the system of the present invention (with an articulating arm).
Figure 2:
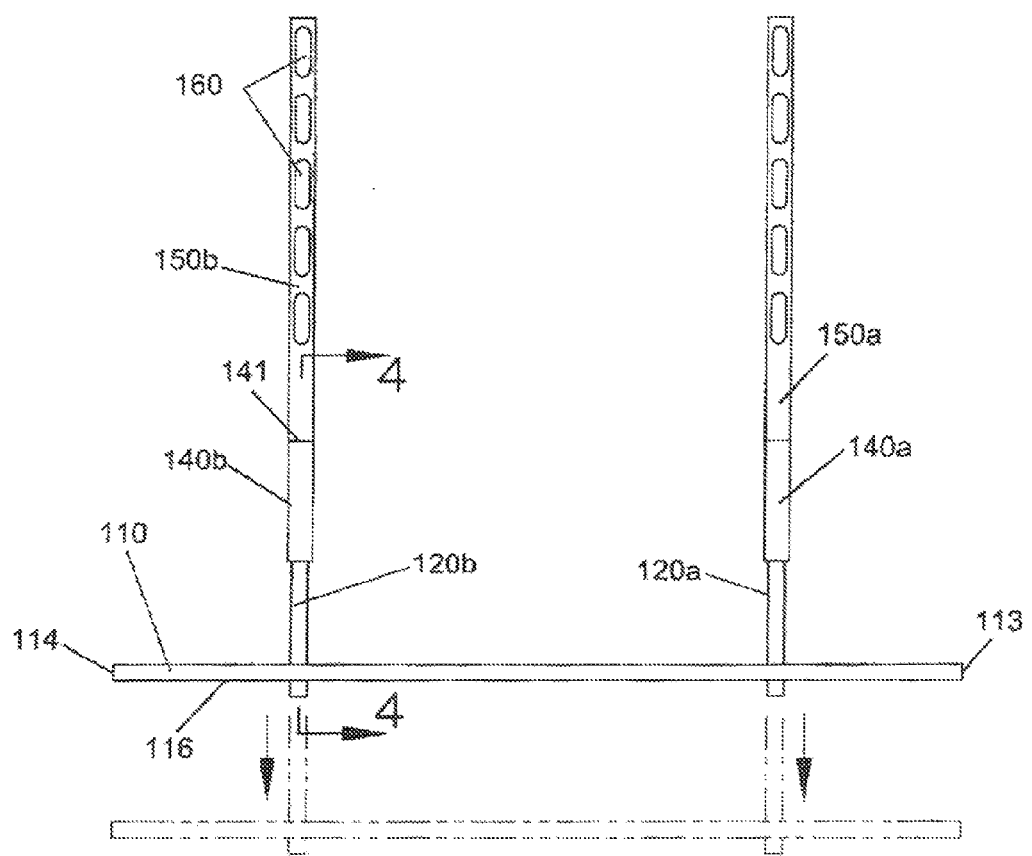
FIG. 2 is a front view of the system of the present invention.

Extending upwardly from the first end 141 of the first mounting tube 140a is a first attachment bar 150a (see FIG. 2). Extending upwardly from the first end 141 of the second mounting tube 140b is a second attachment bar 150b. The attachment bars 150 may be elongated and generally flat. Multiple apertures 160 are disposed along each attachment bar. The apertures 160 are adapted to receive screws or bolts that connect to the television. The attachment bars 150 are adapted to align with the vertical support slats 103b (the slat slots 103c) of the mounting brackets 103 as shown in FIG. 1 and FIG. 1A. In some embodiments, the attachment bars 150 are sandwiched between the television 101 and the vertical support slats 103b of the mounting brackets 130. In some embodiments, the attachment bars 150 are secured to the back of the television and a mounting bracket 103 is not used (e.g., see FIG. 5). The system 100 can be oriented as shown in FIG. 4 or in FIG. 5.

In some embodiments, the system 100 comprises a mounting bracket 103. In some embodiments, the system 100 comprises an articulating arm 104. In some embodiments, the system 100 comprises a mounting bracket 103 and an articulating arm 104.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An adjustable bracket system (100) for supporting auxiliary equipment above or below a television (101), said system (100) comprising:
    (a) a shelf panel (110) having a top surface (115) and a bottom surface (116);
    (b) a first L-shaped support (120a) and a second L-shaped support (120b), each L-shaped support (120) has a support portion (122) and an extension portion (126) that together form an L-shaped piece, the support portions (122) are attached to the bottom surface (116) of the shelf panel (110) and the extension portions (126) extend upwardly from a second end (112) of the shelf panel (110) above the top surface (115) of the shelf panel (110), the L-shaped supports (120) are spaced a distance apart and are oriented parallel to each other;
    (c) a first mounting tube (140a) and a second mounting tube (140b), each mounting tube (140) has a first end (141) and a second end (142), the first end (141) being closed, the second end (142) being open and generally hollow, the top end (127) of the extension portion (126) of the first L-shaped support (120a) is telescopically received in the second end (142) of the first mounting tube (140a) and the top end (127) of the extension portion (126) of the second L-shaped support (120b) is telescopically received in the second end (142) of the second mounting tube (140b), the L-shaped supports (120) are adapted to be secured in a position within the respective mounting tubes (140) via a securing means; and
    (d) a first attachment bar (150a) extending upwardly from the first end (141) of the first mounting tube (140a) and a second attachment bar (150b) extending upwardly from the first end (141) of the second mounting tube (140b), multiple apertures (160) are disposed along each attachment bar (150), the apertures (160) are adapted to receive screws or bolts that connect to a television (101);
    wherein the first attachment bar (150a) and the second attachment bar lie on a plane, plane A, wherein the first mounting tube (140a) and a second mounting tube (140b) lie behind plane A and away from the support portion (122);
    wherein the closed first end (141) of the first mounting tube (140a) prevents the extension portion (126) of the first L-shaped support (120a) from exiting past the first mounting tube (140a), wherein the closed first end (141) of the second mounting tube (140b) prevents the extension portion (126) of the second L-shaped support (120b) from exiting past the second mounting tube (140b).

2. The system (100) of claim 1, wherein the shelf panel (110) is rectangular in shape.

3. The system (100) of claim 1, wherein a first attachment means secures the support portions (122) of the L-shaped supports (120) to the bottom surfaces (116) of the shelf panel (110).

4. The system (100) of claim 3, wherein the first attachment means comprises a screw mechanism, a magnet mechanism, a bracket mechanism, a snap mechanism, a clamp mechanism, or a combination thereof.

5. The system (100) of claim 1, wherein the securing means comprises a spring-loaded pin and aperture means, a screw and aperture means, or a combination thereof.

6. The system (100) of claim 1 further comprising a television (101), wherein the attachment bars (150) are secured to a back portion of the television (101) and the shelf panel (110) is oriented either above or below the television (101).

7. The system (100) of claim 1 further comprising a mounting bracket (103), the attachment bars (150) are secured to vertical support slats (103*b*) of the mounting bracket (103).

8. The system (100) of claim 7, wherein the mounting bracket (103) comprises an articulating arm (104).

9. An adjustable bracket system (100) for supporting auxiliary equipment above or below a television (101), said system (100) consisting of:
   (a) a shelf panel (110) having a top surface (115) and a bottom surface (116);
   (b) a first L-shaped support (120*a*) and a second L-shaped support (120*b*), each L-shaped support (120) has a support portion (122) and an extension portion (126) that together form an L-shaped piece, the support portions (122) are attached to the bottom surface (116) of the shelf panel (110) and the extension portions (126) extend upwardly from a second end (112) of the shelf panel (110) above the top surface (115) of the shelf panel (110), the L-shaped supports (120) are spaced a distance apart and are oriented parallel to each other;
   (c) a first mounting tube (140*a*) and a second mounting tube (140*b*), each mounting tube (140) has a first end (141) and a second end (142), the first end (141) being closed, the second end (142) being open and generally hollow, the top end (127) of the extension portion (126) of the first L-shaped support (120*a*) is telescopically received in the second end (142) of the first mounting tube (140*a*) and the top end (127) of the extension portion (126) of the second L-shaped support (120*b*) is telescopically received in the second end (142) of the second mounting tube (140*b*), the L-shaped supports (120) are adapted to be secured in a position within the respective mounting tubes (140) via a securing means; and
   (d) a first attachment bar (150*a*) extending upwardly from the first end (141) of the first mounting tube (140*a*) and a second attachment bar (150*b*) extending upwardly from the first end (141) of the second mounting tube (140*b*), multiple apertures (160) are disposed along each attachment bar (150), the apertures (160) are adapted to receive screws or bolts that connect to a television (101);

wherein the first attachment bar (150*a*) and the second attachment bar lie on a plane, plane A, wherein the first mounting tube (140*a*) and a second mounting tube (140*b*) lie behind plane A and away from the support portion (122);

wherein the closed first end (141) of the first mounting tube (140*a*) prevents the extension portion (126) of the first L-shaped support (120*a*) from exiting past the first mounting tube (140*a*), wherein the closed first end (141) of the second mounting tube (140*b*) prevents the extension portion (126) of the second L-shaped support (120*b*) from exiting past the second mounting tube (140*b*).

\* \* \* \* \*